United States Patent
Shulman et al.

(10) Patent No.: US 11,907,683 B2
(45) Date of Patent: Feb. 20, 2024

(54) METHOD FOR GENERATING A RANDOM NUMBER, RANDOM NUMBER GENERATION CIRCUIT AND COMPUTER PROGRAM

(71) Applicant: Fraunhofer-Gesellschaft zur Förderung der angewandten Forschung e.V., Munich (DE)

(72) Inventors: Haya Shulman, Darmstadt (DE); Michael Waidner, Darmstadt (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 735 days.

(21) Appl. No.: 16/661,026

(22) Filed: Oct. 23, 2019

(65) Prior Publication Data
US 2020/0167130 A1     May 28, 2020

(30) Foreign Application Priority Data
Nov. 13, 2018  (EP) .................................... 18206017

(51) Int. Cl.
*G06F 7/58* (2006.01)
*H04L 9/08* (2006.01)
*H04L 9/30* (2006.01)

(52) U.S. Cl.
CPC ............ *G06F 7/582* (2013.01); *H04L 9/0869* (2013.01); *H04L 9/30* (2013.01)

(58) Field of Classification Search
CPC .......... G06F 7/582; H04L 9/0869; H04L 9/30
See application file for complete search history.

(56) References Cited

U.S. PATENT DOCUMENTS

| | | | |
|---|---|---|---|
| 6,628,786 B1* | 9/2003 | Dole | H04L 9/0891 380/263 |
| 9,647,335 B1* | 5/2017 | Tujkovic | H01Q 3/34 |
| 11,075,771 B2* | 7/2021 | Sethi | H04L 9/0662 |
| 2006/0072747 A1* | 4/2006 | Wood | H04L 9/0662 380/44 |
| 2006/0177056 A1* | 8/2006 | Rostin | H04L 9/3234 380/46 |
| 2009/0103726 A1* | 4/2009 | Ahmed | H04L 9/12 380/46 |
| 2009/0109854 A1* | 4/2009 | Rajpathak | H04L 67/1023 370/238 |
| 2012/0089839 A1* | 4/2012 | Qiu | H04L 9/0891 713/168 |
| 2014/0100014 A1* | 4/2014 | Bennett, III | G07F 17/3241 463/17 |
| 2015/0372813 A1* | 12/2015 | Brand | H04L 9/0841 713/155 |
| 2016/0124716 A1* | 5/2016 | Venkata | G06F 7/58 708/250 |
| 2016/0134524 A1* | 5/2016 | Beshai | H04L 45/44 370/406 |

* cited by examiner

*Primary Examiner* — Jung W Kim
*Assistant Examiner* — Alan L Kong
(74) *Attorney, Agent, or Firm* — 2 SPL Patent Attorneys PartG mbB; Yong Beom Hwang (57) ABSTRACT

A method for generating a random number comprises selecting a group of at least two servers within a network; receiving a server specific string from at least two servers of the group; and using the server specific strings to generate the random number.

13 Claims, 4 Drawing Sheets

| V \ A | Large | Medium | Small | Stub |
|---|---|---|---|---|
| Large | 0 | 0 | 0 | 0 |
| Medium | 0.1 | 0.0067 | 0 | 0 |
| Small | 0.19 | 0.008 | 0 | 0 |
| Stub | 0.34 | 0.01 | 0 | 0 |

| Test | TOR | Alexa | Mac OS | C | Random |
|---|---|---|---|---|---|
| Entropy (bits/byte) | 7.9998 | 7.9998 | 7.9998 | 4.9 | 7.98 |
| Compression (%) | 0 | 0 | 0 | 38% | 0 |
| $X^2$ exceeds % | 267.96 27.63 | 278.10 15.32 | 241.89 71.26 | 1864 99.99% | 249.51 40.98% |
| μ | 127.37 | 127.54 | 127.6 | 122.94 | 127.5 |
| π error % | 3.146 0.16 | 3.143 0.05 | 3.14 0.03 | 3.18 0.9 | 3.143 0.06 |
| Serial correlation | 0.001 | 0.0009 | 0.002 | 0.5 | 0 |

Fig. 8

METHOD FOR GENERATING A RANDOM NUMBER, RANDOM NUMBER GENERATION CIRCUIT AND COMPUTER PROGRAM

CROSS-REFERENCE TO RELATED APPLICATION

This application claims priority to European Application 18206017.8, filed on Nov. 13, 2018. The contents of the earlier filed application is incorporated by reference herein in its entirety.

FIELD

Exemplary embodiments relate to methods for generating a random number and corresponding apparatuses.

BACKGROUND

Pseudorandom Generators (PRGs) may rely on seed values as an initial input to generate random numbers at subsequent occasions.

Randomness may play a key role in the design of security mechanisms. For example, the security of cryptographic keys, SSL/TLS nonces, initialization vectors for symmetric encryption, password generation, sequence numbers and ports in operating systems, address space randomization for preventing memory corruption vulnerabilities, and more, may all rely on unpredictable sequences of random bits. Access to perfectly random bits may, however, be difficult to realize in practice. Hence, typically, practical systems may collect short random seeds, and use pseudorandom generators (PRGs) to stretch the random seeds into longer pseudorandom strings or bits.

Despite the critical role that secure generation of unpredictable pseudorandom strings may play, there is a long history of successful attacks exploiting bugs and vulnerabilities in PRG's. The causes for vulnerabilities in the generation of pseudorandom strings include faulty implementations, generation of pseudorandomness on virtualized environments, and reuse of randomness.

Randomness failures and vulnerabilities persist to be a major problem in practice and significant efforts are invested in detecting vulnerabilities. Although there may be high efforts to improve the randomness generation, bugs and design failures can always persist and malicious adversarial strategies may be difficult to foresee and counter. Another source of failure may be that developers often develop a system for a set up with access to some randomness sources, and may not anticipate its usage on other platforms, which may lack those sources, for instance, lack of keyboard or mouse inputs on routers or on cloud platforms.

For example, random numbers may be generated by analyzing a random process. Such random processes may be, for example, physical decay processes, where the analysis may require special hardware leading to high costs. Similarly, suitable processes may be, for example, system processes of an operating system on personal computers. Such processes may, however, only provide a low entropy, especially when the components of the system have limited resources. A further method may be to provide newly manufactured devices with a string of random numbers. This process may be relatively complex and may require a personalization of the devices.

Hence, advanced concepts for the generation of unpredictable and statistically equally distributed random numbers may be required for applications which guarantee cybersecurity of systems by use of cryptographic methods.

SUMMARY

An embodiment of a method for generating a random number may comprise selecting a group of at least two servers within a network and receiving a server specific string from at least two servers of the group. The method may further comprise using the server specific strings to generate the random number. Using server specific strings of two or more servers in a network may assure the generation of an unpredictable random number or seed even if some of the servers or parts of the network may be compromised or controlled by a malicious attacker.

In an additional example, receiving a server specific string from a server may comprise negotiating a secure connection with the server. In this way, an existing scenario may be exploited to get a pseudorandom string from a server without any further implementational effort.

Another additional example may further comprise receiving a server specific public key from the server as the server specific string.

An optional example may further comprise transmitting a local public key to the server, and combining the local public key and the server specific public key to generate a server specific secret.

An additional example may further comprise generating a XOR combination of server specific secrets to generate a seed value. Randomness is so achieved by combining different random numbers of different servers, which may not be predictable and difficult to compromise. If at least one of the used servers is uncompromised, one can assume that the generated seed value is secure and unknown.

Another optional example may further comprise using the seed value as a seed for calculating the random number. In this way, a random number may be generated based on a secure and random seed.

In another example, selecting the group of servers may further comprise choosing the servers such that network routes to the servers within the group may not intersect.

In another additional example, selecting the group of servers may comprise choosing the servers such that they may be located in different operator networks.

In this way, the random number may not only be generated unpredictably but also securely. Even if all but one operator network should be controlled by a malicious attacker, the random number may still be random number may still be unknown to the attacker due to its contribution from the remaining server within the uncompromised network. Similar considerations apply for potentially compromised network routes.

In another optional example, using the server specific strings may comprise generating a XOR combination of server specific strings to maintain randomness and security even if multiple server specific strings should be compromised.

Some embodiments may be implemented in specific circuits. For example, a random number generation circuit may comprise a communication interface configured to receive server specific strings from at least two servers of a group of at least two servers within the network, and a combination circuit configured to use the server specific strings to generate the random number.

Another additional example may further comprise a secure communication circuit configured to negotiate a secure connection with the at least two servers.

In an additional example, the secure communication circuit may be configured to receive a server specific public key from a server as the server specific string.

In an optional example, the secure communication circuit may be configured to transmit a local public key to the server, and to combine the local public key and the server specific public key to generate a server specific secret.

In another additional example, the combination circuit is configured to generate a XOR combination of server specific secrets to generate a seed value, and to use the seed value as a seed for calculating the random number.

There may be a demonstrative providing improved concept for generating random numbers being unpredictable.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
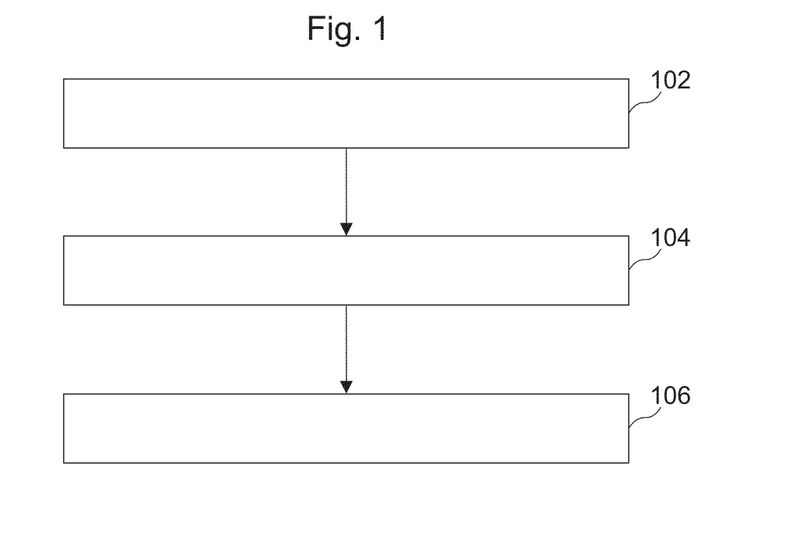
FIG. 1 illustrates an example of a flowchart of a method for generating a random number.

FIG. 1 illustrates an example of a flowchart of a method for generating a random number. The method comprises selecting 102 a group of at least two servers within a network, receiving 104 a server specific string from at least two servers of the group; and using 106 the server specific strings to generate the random number.

Using server specific strings of two or more servers in a network may assure the generation of an unpredictable random number or seed even if some of the servers or parts of the network may be compromised or controlled by a malicious attacker. In this way, the generation of unpredictable and statistically equally distributed random numbers may be provided.

Figure 2:
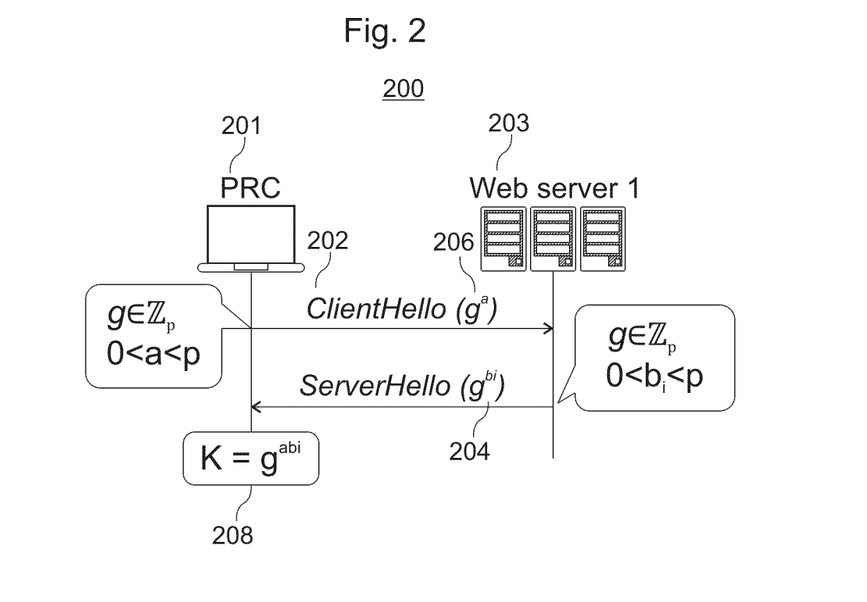
FIG. 2 illustrates an example of a communication to receive a server specific string.

FIG. 2 illustrates an example of a message flow 200 in a communication to receive a server specific string. FIG. 2 illustrates an embodiment where receiving a server specific string from a server 203 may comprise negotiating 202 a secure connection with the server. In this way, an existing protocol may be exploited to get a pseudorandom string from a server for the purpose of an embodiment described herein.

During the negotiation, a server specific public key 204 may be received from the server as the server specific string. Further, during the negotiation, a local public key 206 may be transmitted to the server 203. At a client 201, the local public key 206 and the server specific public key 204 may be combined to generate a server specific secret 208. An example for the process described herein may be the transport layer security (TLS) handshake.

Transport layer security (TLS) is an encryption protocol for providing a secure internet communication. A TLS handshake is a process starting a communication using TLS encryption. In this process, messages are exchanged between two communicating sides to acknowledge and verify each other, establish the encryption algorithms which are used, and agree on session keys. The TLS handshake is an essential part of the hypertext transfer protocol secure (HTTPS).

In particular, the TLS handshake is initiated with a negotiation to agree on a cipher suite used for the session. The client sends a "ClientHello" message which contains the list of supported cipher suites and a random nonce $C_R$. The server selects a cipher suite from the client's list and may send its selection in a "ServerHello" message which may also contain a random nonce $S_R$. The NPC may perform a Diffie-Hellman (DH) key exchange within the TLS handshake, and may collect an exponent received from each server. More specifically, given a prime p and a generator g, the NPC may select an 0<a<p (does not have to be random), and may use it in its DH key exchanges with the t servers. Specifically, it may send $g^a$ to each server, and in return the $i^{th}$ web server may select a random $0<b_i<p$ and may send $g^{b_i}$. The NPC may compute $g^{a \cdot b_i}$.

Specifically, the random number may be defined as a randomness, the server specific string may be a pseudorandom string whereas the server specific public key may be defined as a number $b_i$ ($0<b_i<p$) and the local public key may be defined as a number a a ($0<a<p$), where p is a prime.

Further, multiple server specific secrets may be combined by a XOR combination of the server specific secrets to generate a seed value.

Figure 3:
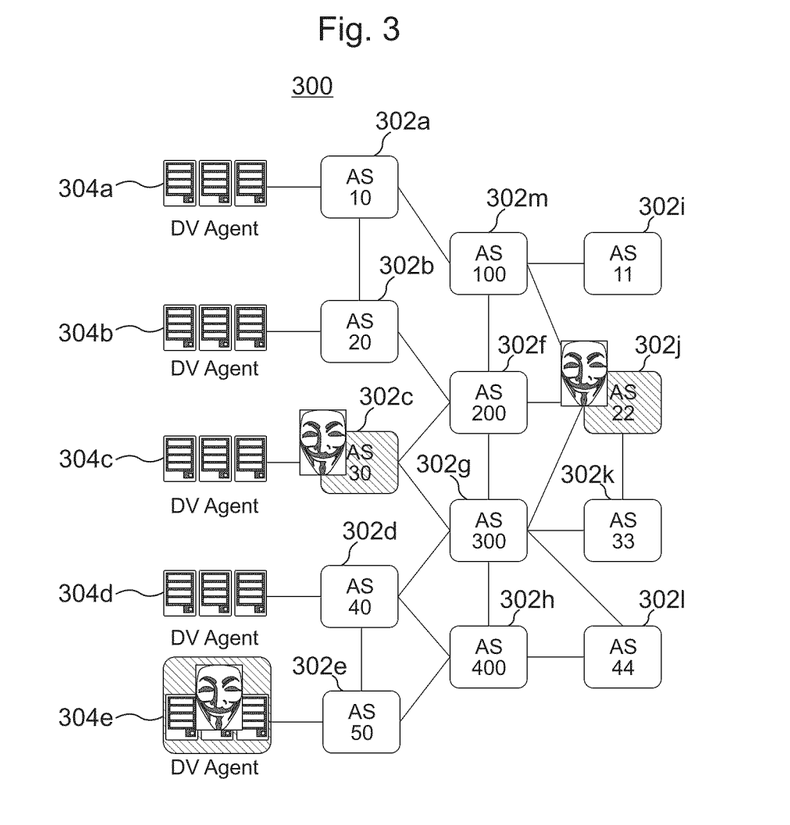
FIG. 3 illustrates an example of a network.

FIG. 3 illustrates an example of a network to illustrate server selection according to some embodiments. Selecting the group of servers may comprise choosing the servers such that network routes to the servers within the group may not intersect. The network comprises multiple sub-networks 302a to 302m. Servers 304a to 304e may be located within sub-networks 302a to 302e, respectively. It is assumed that server 304e and sub-network 302c are compromised. From the perspective of a client located in, for example, sub-network 302g, the servers are chosen such that they are located in different operator networks.

Even though the server specific string of server 304e as well as the server specific string of server 304c may be compromised (since the network route from the client in sub-network 302g to server 304c is compromised), the generated random number will be uncompromised due to the contributions from the remaining servers 304a, 304b and 304d.

Figure 4:
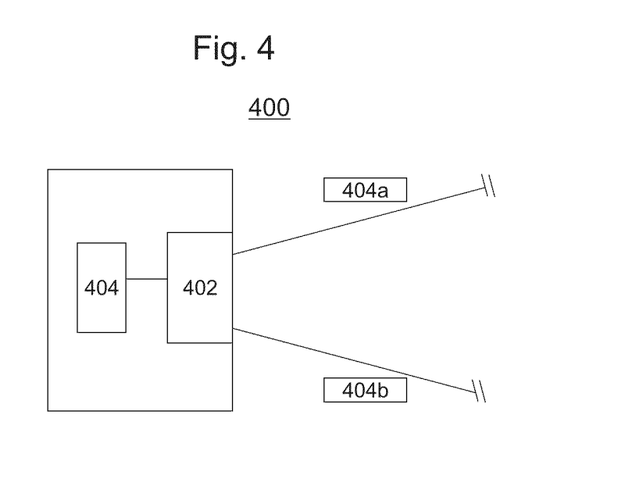
FIG. 4 illustrates an example of a random number generation circuit.

FIG. 4 illustrates an example of a random number generation circuit 400.

The random number generation circuit 400 may comprise a communication interface 402 configured to receive server specific strings 404a, 404b from at least two servers of a group of at least two servers within a network. A combination circuit 404 may be configured to use the server specific strings to generate the random number.

The random number generation circuit 400 may be a pseudorandom generator (PRG), a network pseudorandomness collector (NPC) or a combination of a PRG and a NPC, in tandem mode.

The network pseudorandomness collector (NPC) collects randomness from public servers in the Internet. The collection process does not require any changes to the servers nor synchronization with the servers. Some of the servers may be hosted in untrusted networks, some others may be compromised. Pseudorandom generators (PRGs) are deterministic algorithms that expand short random strings into long pseudorandom sequences which distribution should be indistinguishable from the uniform distribution to any efficient adversary.

The communication interface 402 may serve to establish a connection between a server and a client, either via cable connection like, for example, Ethernet, or via wireless communication like, for example, WiFi or LTE.

The combination circuit 404 may be a computer or a CPU, and the secure communication circuit may be a processor performing the protocol of the TLS handshake from the client's side.

A further optional secure communication circuit may be configured to negotiate a secure connection with the at least two servers.

According to some embodiments, the secure communication circuit may be configured to receive a server specific public key from a server as the server specific string.

According to some embodiments, the secure communication circuit may be configured to transmit a local public key to the server; and to combine the local public key and the server specific public key to generate a server specific secret.

According to some embodiments, the combination circuit may be configured to generate a XOR combination of server specific secrets to generate a seed value; and to use the seed value as a seed for a calculating the random number.

Further aspects of the technology related to the embodiments described herein and further embodiments are described in the following paragraphs.

In further exemplary embodiments, pseudorandom generators (PRGs) may play an important role in security of systems and cryptographic mechanisms. Significant efforts in the theoretical and practical research communities may be invested to improve the security of PRGs, to identify faults and entropy sources, and to detect vulnerabilities allowing attacks against the PRGs.

In the alternative approach described herein at the pseudorandomness generation problem, a network pseudorandomness collector (NPC) is designed and implemented which may collect pseudorandom strings from servers in the Internet. NPC may not require Corporation nor synchronization of those servers. NPC may be easy to use and integrate into the existing systems. The security of NPC will be analyzed subsequently, and it will be motivated how a NPC may address the main factors behind the vulnerabilities in PRG's. Further, extensive simulations on empirically derived data sets that may validate the security of NPC against attacks by realistic Internet man in the middle (MitM) attackers will be performed. For a practical implementation, a library, called "crandom", is described which may implement a NPC so that one may set up a public online NPC service based on "crandom".

For mitigating the problems with randomness generation, an alternative approach may be taken. The network pseudorandomness collector (NPC) for secure generation of randomness may be designed. NPC may collect randomness from public servers in the Internet. The collection process may not require any changes to the servers nor synchronization with the servers. Some of the servers may be hosted in un-trusted networks, some others may be compromised. For security of NPC to hold it may be only required that not all the servers may be corrupted at the same time. The idea may be that when at least one server may provide secure randomness—NPC may output a secure pseudorandom string.

NPC may be used as a stand-alone mechanism for generation of pseudorandom bits and may also be applied to complement the existing PRGs. For instance, the pseudorandom strings output by the NPC may be used together with the system PRGs, for example via $\oplus$ operation, to enhance the security of the produced pseudorandom strings of PRGs. Alternately, NPC may be used as a fallback option, for instance, when system entropy pools may be exhausted (saved by a malicious process), or in scenarios where user input may not be available and randomness may be difficult to generate, such as in virtual environments (for example on cloud platforms).

A library based on NPC may be developed, called "crandom", which can be used by operating systems independently or in tandem with the existing libraries, such as "dev/urandom". There may also be provided access to an online tool (as well as the code of NPC) that may be set up at "http://45.76.90.74/random/". The tool may use "crandom" for collection of pseudorandom strings, and may apply them to generate and output a pseudorandom string of the requested length.

Since random bits may be scarce in practice, pseudorandom generators (PRGs) may be used. PRGs may be deterministic algorithms that may expand short random strings into long pseudorandom sequences which distribution may be indistinguishable from the uniform distribution to any efficient adversary. The security of the pseudorandom strings produced by PRGs may rely on the fact that the internal state may be initialized with a truly random seed and that it may remain secret at all times. In practice the systems may not have access to secret and perfect randomness, for example, the seed may often be collected after a reset or a reboot from low entropy sources. In virtualized environments the guest machine may use "the same" randomness when it may be restarted from an image. There may also be other vulnerabilities and attacks against PRGs.

NPC may address the main shortcomings in existing PRGs. Specifically, NPC may allow an automated generation of pseudorandom strings, without dependency on entropy sources or user input. NPC may provide robustness by avoiding dependency on one system (for example, which may be faulty or vulnerable). Hence, failures of some of the servers or attacks against some of the servers may not subvert the security of the overall system. On a high level, NPC may establish connection to well-managed servers in the Internet and may collect randomness from them. However, the strings received from some of the servers may be "insecure" (for example, not random or may be known to the attacker). To ensure security, NPC may perform a XOR over all the received strings. Hence, the output may be secure (for example, pseudorandom) as long as at least one received string may be secure.

A strong but realistic MitM (Man in the Middle) attacker may be considered, that may eavesdrop, remove or inject packets into the communication stream. The attacker may also corrupt servers. Such an attacker may be an Internet service provider (ISP) or an autonomous system (AS). The attacks may be perpetrated by cyber criminals or by a government agency. The attacker may control some of the Internet networks and may be located on some of the communication paths that the victim may use. The attacker may be "realistic" in that it does not control all the networks and servers in the Internet (attacker model see FIG. 3).

In this sense, a network pseudorandom collector (NPC) may be designed and developed. Using a "clever" selection of the servers which a NPC may query, may allow generating pseudorandomness without any initial random seed. The idea may be replacing cryptography through assumptions in distributed systems. The security of NPCs may depend on the servers which NPCs may select to query: (1) the servers may provide "secure" pseudorandom strings, and (2) the selection of the servers may be done so that the security of the overall system may be preserved. Both of these conditions may be insured. The strings collected from services, like Alexa and TOR nodes, may have equivalent security to a patched BSD with access to multiple entropy sources. To show the latter, a server selection algorithm may be designed and simulations may be run to demonstrate its security against strong realistic MitM adversaries.

NPC may be implemented as a new library, "crandom", and may be tested on Android and UNIX operating systems. NPC may be an efficient, practical and easy to adopt mechanism for generation of pseudorandom bits. It may enable easy, efficient and automated generation of pseudorandom bits for systems and services as well as for tasks and applications that end users may need, such as cryptographic keys generation.

Many high profile PRG failures and vulnerabilities were exploited for attacks. The attacks against PRG's may lead to exposure of private keys of cryptographic systems, low entropy may allow recovery of plaintext and may enable attackers to predict the ephemeral Diffie Hellman session keys.

A central vulnerability may be insufficient entropy, which may happen during boot, or when randomness pools and operating systems may be exhausted, for example in Linux when a global file descriptor limit may be reached, no process may access the system randomness via "/dev/random". Most applications then may proceed without the randomness from the operating system. In that case cryptographic libraries may produce vulnerable keys which may potentially affect the security of multiple applications. In particular, many components of Open SSL, including SSL/TLS pre-master secret generation and RSA key generation, as well as the "arc4random" function used for cryptographic randomness in FreeBSD, Open BSD and Mac OS, may all be affected by this issue.

These vulnerabilities may allow an attacker, based on the output it may receive from a PRG, to predict the future PRG output and in some cases even the value of the random seed. System PRGs may provide poor security in virtualized environment. A user space process such as TLS may suffer significant loss of security when run in a virtual machine (VM) that may be resumed multiple times from a snapshot. Resets may lead to exposure of secret keys generated after snapshot resumption. Among other factors causing the weakness, the software entropy sources may be weaker on virtualized environment, for example due to lack of mouse and keyboard inputs.

A large-scale Internet measurement of SSH and TLS keys generated by headless or embedded systems, and server management cards, found vulnerabilities in cryptographic keys caused by insufficient entropy and inputs to PRGs. The causes for the problems may be mainly faulty implementations that may generate keys automatically on first boot without having collected sufficient entropy. On traditional PCs the problems may be less likely to occur. Nevertheless, recent evaluation of key generation may show vulnerabilities in DNS SEC key generation in well-established large registrars and DNS hosting providers and may trace the problems to reuse of cryptographic material and attempts to save on randomness.

NPC may mitigate the problems in PRG by taking an alternative approach to pseudorandomness generation.

The goal of a network pseudorandomness collector (NPC) is to collect pseudorandom strings from public Internet servers and based on those strings to generate and output up pseudorandom string. The strings can be collected from web servers, TOR nodes, and generally any servers which may be willing to accept and establish cryptographically protected connections with clients.

The NPC may receive in an input list of servers that support HTTPS, may select a subset t of servers from the list and may query them for pseudorandomness. Upon receipt a pseudorandom string from each server, the NPC may XOR all the t received strings, and may output the result.

A critical part of the protocol may be the server selection, which may guarantee security against realistic network protectors, for example, even if the attacker may be a large Internet service provider (ISP) or may operate a content distribution network (CDN).

To guarantee that, the NPC may select the servers such that no two servers may be located in the same network and the communication paths between the NPC and the servers may not overlap. To ensure this, the NPC may use the empirically derived CAIDA AS-level graph (which contained 57K ASes in July 2018). The graph is annotated with bilateral business relationships. The NPC identifies ASes that host the servers by mapping the IP addresses of the servers to AS numbers using RIPE (https://stat.ripe.net) and stores the ASes where the servers are located in AS-servers-list. The NPC also maps its own IP address to an AS number (stores it in "own-AS"). The algorithm then proceeds as follows:

```
"INPUT: AS-graph, servers-AS-list, own-AS, t
i = 0
    while i < t
    select server s[i] from servers-AS-list
    s[i].AS-PATH <- AS-graph
    if s[i].AS not in list & s[i].AS-PATH not in list
        add s[i] to list
    i++
return list".
```

The algorithm may run t iterations. In each iteration the algorithm may select a server from the input list "servers-AS-list", may check that it is not located on the same network with any of the selected servers and that the path to it may not overlap with any other server. Finally, the algorithm may output the list "list" which may contain the set of servers which the NPC may query for the pseudorandom strings.

The NPC may go over the list of servers, may establish a TCP connection to each of them, subsequently initiating a TLS connection establishment. The TLS handshake is initiated with a negotiation to agree on a cipher suite used for the session. The client sends a "ClientHello" message which contains the list of supported cipher suites and a random nonce $C_R$. The server selects a cipher suite from the client's list and may send its selection in a "ServerHello" message which may also contain a random nonce $S_R$. The NPC may perform a Diffie-Hellman (DH) key exchange within the TLS handshake, and may collect an exponent received from each server. More specifically, given a prime p and a generator g, the NPC may select an 0<a<p (does not have to be random), and may use it in its DH key exchanges with the t servers.

Specifically, it may send $g^a$ to each server, and in return the $i^{th}$ web server may select a random $0<b_i<p$ and may send $g^{b_i}$. The NPC may compute $g^{a \cdot b_i}$.

At the completion of the protocol NPC may obtain t values $(g^{a \cdot b_1}, \ldots, g^{a \cdot b_i})$ where $g^{a \cdot b_i}$ may be the value obtained during the $i^{th}$ protocol execution with web server i. Each string may be pseudorandom and at least 128 bytes long (1024 bits). NPC then may compute a vector of strings s as an exclusive OR: $s=(g^{a \cdot b_i} \oplus, \ldots \oplus g^{a \cdot b_i})$ and may store the seed s.

Using t servers may ensure security even if some of the servers may be compromised or may provide a "vulnerable" randomness, or if the attacker may eavesdrop on some of the networks or paths. Computation of an exclusive OR of the string with random strings may result in a random string hence assuming that at least one of the servers may provide a pseudorandom $g^b$, the output s of the NPC during one such execution may be a pseudorandom 1024 bit string. The security of the output holds due to the DH property. The NPC may also be secure against past and future break-ins. Compromising the system may not assist in compromising past or future connections since the random strings may not be generated locally but collected remotely.

The probability that at least one of the t servers provides a "good" randomness may be calculated. Simulations may be performed to demonstrate the resilience against active and passive attackers which demonstrates the importance of server selection for ensuring security. For the simulations (as well as in the implementation) the 10K top Alexa Web servers may be used.

The probability, when selecting t servers, that at least one of the t servers may provide "good" pseudorandomness is high. Denoting the set of all potential servers with n, out of them, G is the set of good servers and C is the set of corrupted servers. First, the attacker may select the set C of corrupted servers, then when the set of corrupted servers may be determined, the NPC selects the set t of servers. The question may appear, what may be the probability that at least one server out of t may be good. The problem may be characterized with a hyper geometric distribution, with a probabilistic random variable X.

$$Pr[X = i] = \frac{\binom{C}{i} \cdot \binom{N-C}{t-i}}{\binom{N}{t}}$$

The numerator may say that given the set of corrupted servers C, t may be selected from the remaining N−C servers such that t may contain 0 servers from the corrupted servers. The denominator may count all possible ways to select t servers out of N servers. For security of the NPC to hold it may be sufficient that at least one of the t selected servers may be good, namely, $Pr[X \geq 1]$. Assuming that N=1000, number of corrupted servers C=50 and the NPC may select 10 servers, then Pr $[X \geq 1]$=0.999. This shows that even for a relatively limited group of servers (for example 1000) with 50 corrupted servers, the probability that at least one may be good, is high.

In reality it is not easy for an attacker to corrupt multiple servers—the servers may run different software and operating systems, may be operated and owned by different entities, and located in different networks. This calculation means that even if one given attacker may corrupt a set of servers out of a large group of servers (such as the list of servers of Alexa) the probability that at least one selected server may be good, is high.

Here, the question may appear, how strong the attacker may be to be able to intercept all of the strings sent by the servers. Further, the question may appear, whether a realistic MitM attacker may observe or hijack all of the pseudorandom strings. To answer these questions, the ability of an on-path attacker to intercept almost all the pseudorandom strings from servers to the NPC may be quantified. Simulations may be performed using, for example, the top 10K Alexa servers that support HTTPS.

Simulations may be run over different attacker NPC pairs (namely, different locations of attacker and NPC may be selected) and the fraction of Alexa servers whose BGP route to NPC traverses the attacker. Simulations with the BGP route computations may be run to the empirically derived CAIDA AS-level graph (the dataset from April 2017 was used, which contains 57256 ASes). The measurements were averaged over $10^6$ combinations of attacker-NPC AS pairs, selecting them randomly. To identify ASes that host web servers, the IP to AS numbers were mapped using RIPE.

The simulations may evaluate all the possibilities for an on-path attacker to cover almost all the routes between the NPC and the web servers. ASes may be categorized into four classes: large ASes with more than 250 customers, medium ASes that have between 25 and 250 customers, small ASes with 1 to 25 customers and stub ASes that have no customers. The corresponding graph had in total 57256 nodes and 246143 edges.

Figure 5:
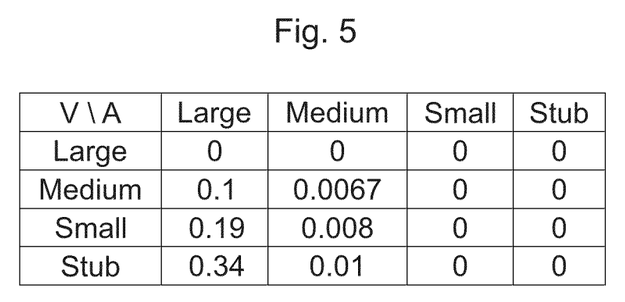
FIG. 5 shows the evaluation of on-path attackers (number of attackers, given in %, capturing traffic from more than 90% of the web servers)

For each combination of attacker-NPC ASes pairs, the fraction of the pairs in which the attacker may capture traffic from more than 90% of the web servers were measured. This would be a very strong attacker, nevertheless it is shown that the NPC would still be secure. In practice the attackers are of course much weaker. The simulations show that only 0.1% of the attackers may be on the path between the NPC and 90% or more of servers, and hence may capture the traffic between NPC and the servers. No attacker can capture 90% of the traffic to the servers when the NPC is in a large AS. Attackers that may be small ISPs or stubs cannot launch successful attacks. The results of the simulation are summarized in FIG. 5.

Since a MitM attacker may not subvert the security of the NPC, it may also attempt to perform launch border Gateway protocol (BGP) prefix hijacks, in order to attract Internet traffic from other networks which it may not control. BGP may be known to be vulnerable to prefix hijack attacks. In prefix hijacks, the attacker may hijack all the traffic of a victim network.

Figure 6:
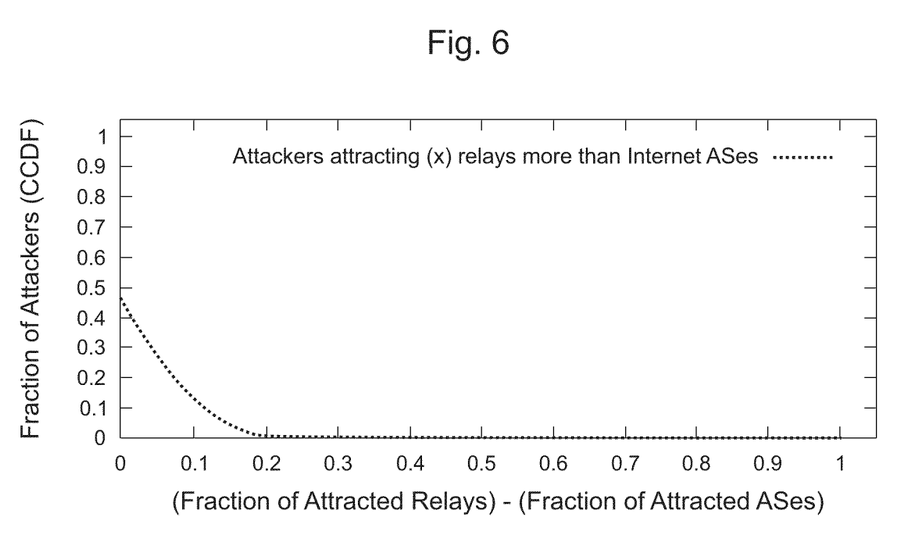
FIG. 6 illustrates a graph showing attracting web servers vs. attracting Autonomous Systems (ASes) in the Internet.

The attacker's ability may be evaluated to exploit the insecurity of BGP to hijack traffic between the network on which the NPC may be operated and the web servers. In this case both the victim and the attacker may announce victim's BGP prefix. The fraction of the web servers that the attacker may attract may be evaluated. The probability that the attacker attracts more than 90% of the web servers is about 2%. The simulation also shows that attackers that can hijack traffic from 90% of the web servers, may disconnect the victim from the rest of the Internet. Only 0.20% of the attackers may successfully launch the attack while maintaining their roots to be victim in order to relay packets between the victim and the rest of the Internet to avoid detection. This may be due to the fact that the fraction of the web servers that the attacker hijacks may be close to the fraction of the ASes in the Internet that the attacker may attract when announcing the victims prefix; see the simulation plotted in FIG. 6. In order to prevent the NPC from generating randomness, the attacker may hijack traffic from almost all the servers and hence disrupt the parts to the victim from almost all the ASes in the Internet.

Another strategy that the attacker may take may be to attempt to drop some of the responses from the server so that less than t pseudorandom strings may reach the NPC. There may be two ways to cope with this: (1) increase the t, for example to K=c×t (where c may be a constant), or (2) use exponential backoff.

In case a connection to some web server may not be established, for example, the web server may be unreachable, NPC may select two other web servers (out of the list of n) servers, and attempts to establish connection to them. NPC may proceed, each time increasing the number of attempted connections exponentially. During attempt i (after i−1 failed attempts) the NPC may establish $2^{i-1}$ connections.

If the NPC successfully establishes $j<2^{i-1}$ connections (for example, during attempt i), it may store all the collected j pseudorandom strings from these connections for future use. An exponential backoff may be needed for networks to cope with high packet loss rates which may be malicious attacks where the attacker blocks the access to the web servers.

A daemon may be implemented which periodically runs and invokes "crandom" when the pseudorandomness is below a given threshold. The collected pseudorandom strings may be stored, and may be available for applications. This "offline" mode for collecting pseudorandom strings may allow offering higher efficiency for applications when randomness may be needed.

The configuration of the NPC may be flexible and defined via parameters in the configuration file. The main ones may be listed: (1) the path to the list of n servers, default may be Alexa Web servers, which may be also used in the implementation and simulations (any SSL/TLS supporting servers may be used); (2) κ servers to query; (3) the initial index i of the κ out of n servers to query; (4) the minimum number of responses t that may be sufficient for calculation of the output; (5) a flag may be batch mode may be used in the size of the pseudorandom string that may be stored.

The pseudorandom strings produced by NPC may be as secure as the pseudorandom strings collected from the servers in the Internet. An evaluation of security of the strings' series produced by Alexa websites and by TOR nodes was performed and tested if they satisfy the statistical tests for randomness. The goal of statistical tests is to evaluate that in the long run, the frequency of 0's and 1's in the sequence should be nearly the same.

A popular software test package ENT to apply statistical tests on the generated sequences was used. ENT provides a comprehensive analysis of randomness testing for cryptographic applications; it applies statistical tests over an input sequence and produces an output according to common randomness properties. For each test, the ENT suite program generates an entropy, $\chi^2$ value, an arithmetic mean value μ, a Monte Carlo value for π, and a serial correlation coefficient. These tests measure different properties of the strings appearing in the tested sequence.

Figure 7:
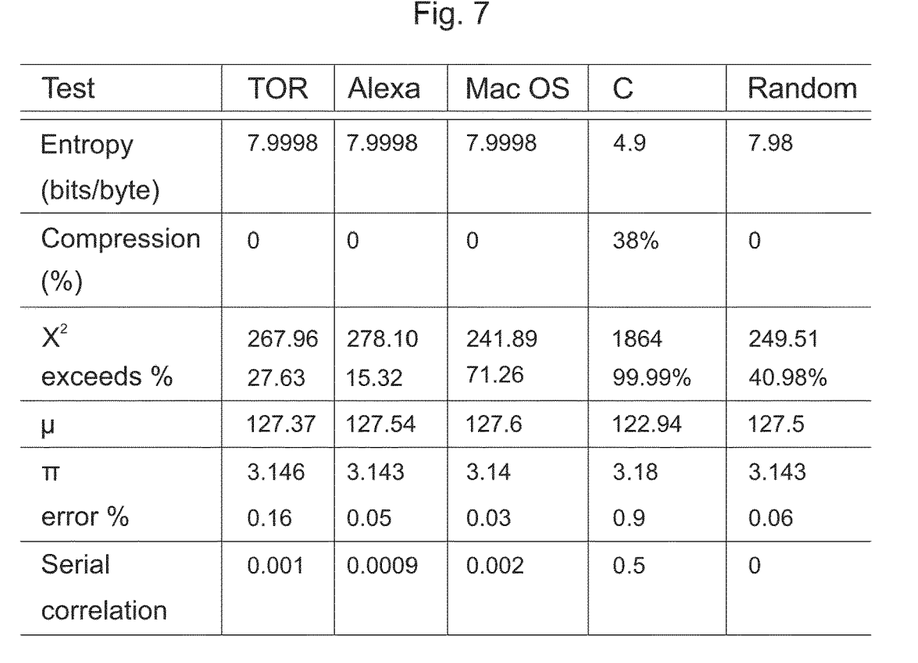
FIG. 7 shows the results of statistical tests over sequences produced by TOR nodes, Alexa servers and Mac OS, and comparison to a random and non-random sequence.

These tests were applied on a number of sequences of strings collected from: (1) TOR nodes, (2) 10K-top Alexa servers, and (3) and up to date patched "/dev/random" library and Mac OS. For each of these sources, 1 MB file size of strings were collected, and the tests were applied on each of these files. The results are reported in FIG. 7. For comparison, also results are provided of the tests applied to a truly random sequence (generated by timing radioactive decay events, see http://www.fourmilab.ch/hotbits/) and to a c-code. The abbreviation "exceeds % of $\chi^2$", in the table, is the degree to which the sequence tested is suspected of being non-random. If the amount is greater than 99%, then the sequence is not random.

Figure 8:
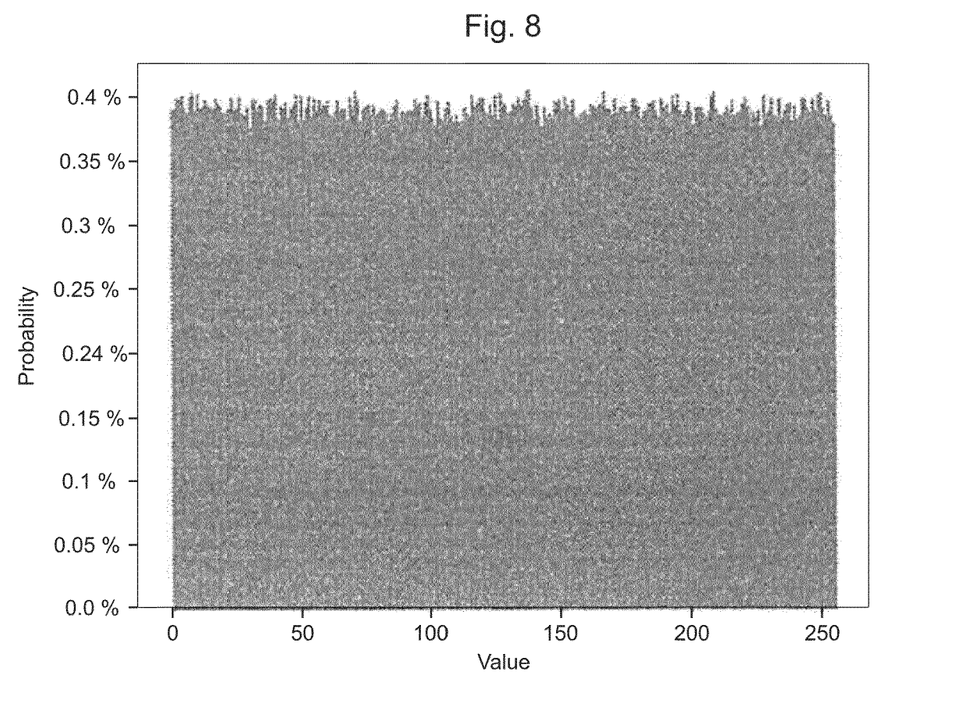
FIG. 8 illustrates a histogram showing probability of the appearance of different values in collected sequence from TOR nodes.

The uniformity of the distribution is also evaluated, i.e., the probability of the appearance of different values in the sequence. The results are plotted in a histogram in FIG. 8. The plot shows that the generated sequence is close to a uniform distribution.

Using TOR or 10K-Top-Alexa servers may yield an entropy of 7.9998 bits/byte, for example, it may be statistically very close to a real source of randomness and may offer the same entropy as, for example, Mac OS. Keys of symmetric cryptographic systems may be generated directly.

Randomness may be essential for bootstrapping cryptography. However, often randomness may be difficult to obtain or generate in practice. Many high profile PRG failures and vulnerabilities have been reported over the years, and significant practical as well as theoretical research efforts are focused on improving the situation and enhancing the security of PRGs. However, some practical issues are difficult to resolve, such as randomness generation on virtual platforms, where the same VM image may be reused, or where limited sources of randomness may be available, for example, in devices which lack human input, such as embedded devices or routers. Furthermore, even when the hardware is not a problem, lack of automation of entropy generation may also pose a risk, as may be indicated by the reuse of keys by the registrars and hosting providers.

An alternative approach to bootstrap security is taken. The idea is to replace cryptography through assumptions in distributed systems. A system, called network pseudo-randomness collector (NPC), is designed and implemented for collection of pseudorandomness in the Internet, utilizing the distributed nature of the Internet and making structural assumptions about the attacker's capabilities.

The NPC may tackle the problems in current PRGs, while ensuring high efficiency, automation, and security against past and future break-ins. The NPC may be used as a stand-alone mechanism or may be applied in tandem with the existing system PRGs, or used as a fallback option, for example, to prevent applications from stalling in case the system randomness pools may be exhausted. This may allow to enhance security while eliminating a single point of failure.

A library "crandom" may be provided implementing the NPC—it may be used in operating systems in tandem with "urandom" and "random". Also, a website "http://45.76.90.74/random/" may be set up, which may be based on "crandom" and may output pseudorandom strings of the requested length to clients.

For further examples, a few follow-up directions, which may be interesting to pursue in the context of randomness collection in the Internet, may be proposed. (1) to evaluate approaches for improving efficiency for use of NPCs on mobile (and other limited) devices, e.g., to apply extractors, to extract the entropy from the collected strings in order to reduce the required storage requirements on systems with limited resources and to reduce the number of times a NPC has to be executed; (2) another direction may be to optimize the CPU and other resources needed for NPC vs PRGs. This may be particularly important for mobile devices where sockets may consume a large fraction of battery life. Hence, a related future question may be to optimize strings collection to reduce transmission time, (3) a NPC may be designed to provide security when operated on trusted networks. The question may appear, what may happen on public networks, such as hotels, airports, cafes, university networks. Currently the implementation may be configured to collect strings on networks which may be trusted and to batch the collected strings for later use when on untrusted networks. An interesting research direction is to consider alternative approaches.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for generating a random number, comprising:
   selecting a group of at least two servers within a network;
   receiving at least two server specific strings from at least two servers of the group;
   generating a server specific secret for each of the at least two servers of the group based on the server specific string received from each of the at least two servers of the group such that at least two server specific secrets are generated for the at least two servers of the group;
   combining the at least two server specific secrets or the at least two server specific strings to generate a seed value for a random number generator; and
   generating a random number using the seed value,
   wherein selecting the group of servers comprises choosing the servers such that network routes to the servers within the group do not intersect.

2. The method of claim 1, wherein receiving a server specific string from a server comprises:
   negotiating a secure connection with the server.

3. The method of claim 2, further comprising:
   receiving a server specific public key from the server as the server specific string.

4. The method of claim 3, further comprising:
   transmitting a local public key to the server; and
   combining the local public key and the server specific public key to generate the server specific secret.

5. The method of claim 4, further comprising:
   generating a XOR combination of the server specific secrets to generate the seed value.

6. The method of claim 1, wherein selecting the group of servers comprises choosing the servers such that they are located in different operator networks.

7. The method of claim 1, wherein using the server specific strings comprises generating a XOR combination of server specific strings.

8. A non-transitory computer-readable medium including program code for, when executed by a programmable processor, performing a method of claim 1.

9. A random number generation circuit, comprising:
   a communication interface configured to receive at least two server specific strings from at least two servers of a group of at least two servers within a network; and
   a combination circuit configured to generate a server specific secret for each of the at least two servers of the group based on the server specific string received from each of the at least two servers of the group such that at least two server specific secrets are generated for the at least two servers of the group, combine the at least two server specific secrets or server specific strings to generate a seed value for a random number generator, and generate a random number using the seed value,
   wherein the group of servers are selected such that network routes to the servers within the group do not intersect.

10. The random number generation circuit of claim 9, further comprising:
    a secure communication circuit configured to negotiate a secure connection with the at least two servers.

11. The random number generation circuit of claim 10, wherein the secure communication circuit is configured to receive a server specific public key from a server as the server specific string.

12. The random number generation circuit of claim 11, wherein the secure communication circuit is configured to transmit a local public key to the server; and to combine the local public key and the server specific public key to generate the server specific secret.

13. The random number generation circuit of claim 12, wherein the combination circuit is configured to generate a XOR combination of server specific secrets to generate the seed value; and to use the seed value as a seed for calculating the random number.

* * * * *